United States Patent Office 3,479,482
Patented Nov. 18, 1969

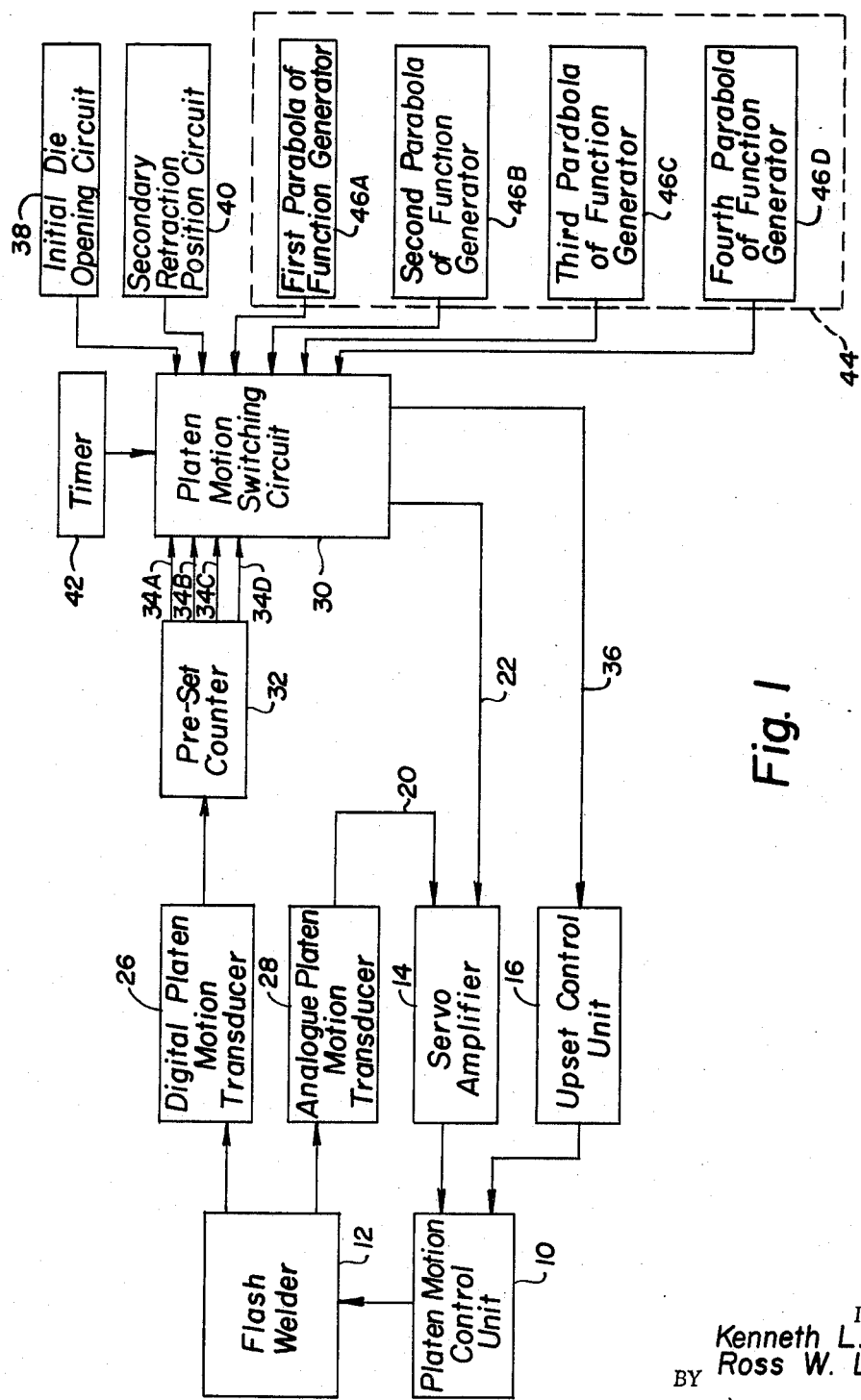

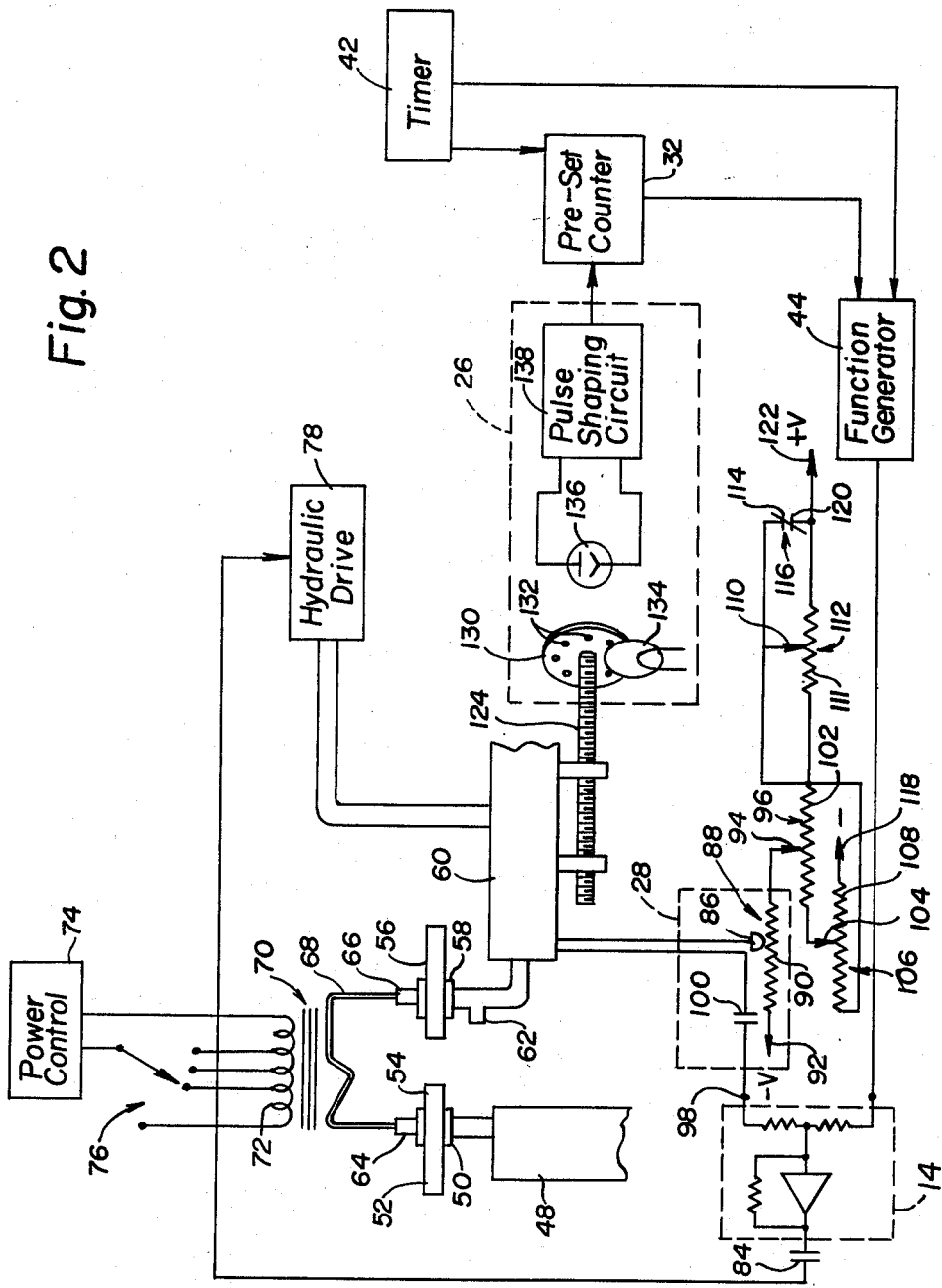

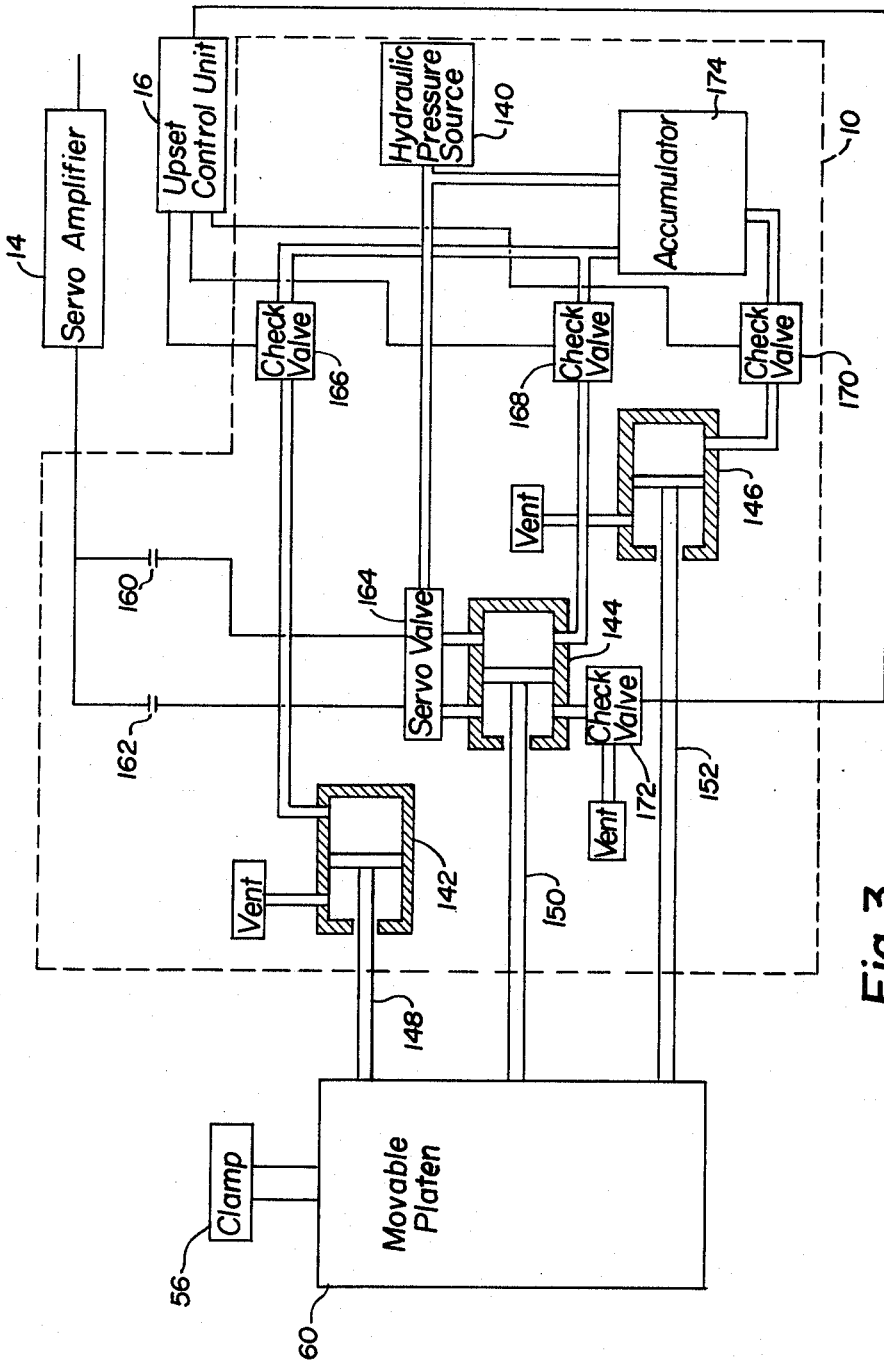

3,479,482
FLASH WELDER
Kenneth L. Erwin, Newton Falls, and Ross W. Lodwick, Poland, Ohio, assignors to The American Welding & Manufacturing Company
Filed June 8, 1966, Ser. No. 556,090
Int. Cl. B23k *11/04*
U.S. Cl. 219—100                                 8 Claims

ABSTRACT OF THE DISCLOSURE

Digital signals are provided that are related to movement of a movable platen holding a workpiece. The digital signals direct production of analogue control signals that control movement of the platen. During a flashing operation, a plurality of analogue signals are consecutively utilized, each analogue signal having an exponential waveshape. The times at which the various exponential analogue signals assume and relinquish platen control are determined by counting the digital signals produced as the platen moves and changing from analogue signal to analogue signal at predetermined counts.

---

This invention relates to flash welding and more particularly relates to methods and apparatuses for controlling the motion of platens which hold workpieces that are to be flash welded together.

In flash welding the workpieces that are to be welded are brought together while welding potential is applied between them so that as they engage a flash weld is formed along their abutting surfaces. Flash welding may be thought of as including three main steps.

During the first of these steps, the edges of the two workpieces that are to be welded together are smoothed off. This is accomplished by bringing these two edges close together and applying a flashing voltage between the two workpieces. Projections and ragged portions of the edges are burned off by this flashing potential.

The second main step in flash welding is the heating of the workpieces to the proper temperature for welding. This is done as the workpieces are brought closer together than they were in the prior step. The first two steps are frequently called the flashing stage of the welding cycle.

The final step in flash welding occurs after the workpieces have been brought to the proper temperature. In this step, the two edges are jammed together with a predetermined force to effect the weld. This step is called "upsetting."

It has been found that the quality of the weld obtained in flash welding is dependent to a great extent upon the pattern of motion of the two workpieces during the flashing stage. If this movement is improper, an unsatisfactory weld results. Furthermore, if the movement cannot be closely controlled, the welds will be unpredictable.

If the workpieces are brought together too rapidly, a preliminary welding and freezing occurs along the edges. On the other hand, if the workpieces are brought together too slowly, or if the welding impact (upsetting) does not occur at the proper time, a layer of oxidized metal is frequently included within the weld.

Because of these factors, it is very desirable that the patterns of motion of the platens which hold the workpieces be closely controlled so that predictable welds may be obtained from a series of similar materials. Furthermore, it is desirable that the patterns of motions be easily changed so as to reduce the set-up time between different jobs.

It is possible to control the motion of the platens carrying the workpieces during the various steps of flash welding by mechanical cams. This type of control is quite accurate. However, it is very difficult to change the pattern of motion when cams are used. The setting-up time for new jobs is therefore very great.

It is also possible to control the motion of the platens by using analogue voltages that are obtained from electronic function generators. These voltages may be used to control various types of actuating mechanisms for moving the platens. They may, for example, control a hydraulic drive system by varying the amount of fluid flowing through the servo valves that control the position of the platen. In this manner, the arbitrary voltages derived from the analogue function generators can move the platens in a predetermined pattern. Adjustable function generators are available so that the set-up time for different jobs can be reduced. However, analogue function generators are subject to drifting because of noise. Furthermore, their characteristics frequently change with time because of the aging of electrical components. A small amount of drifting during the beginning of a cycle may accumulate to create an error throughout the entire cycle in such a system. Because of these defects, it is difficult to repeat an operation several months or years later since the settings on the function generator will no longer be the same.

In the present invention, an accurate digital setting to initiate and terminate analogue control signals for the beginning and ending portions of stages of the flash welding process is made available. These digital settings are related to the position of the platens. The settings do not change with time due to changes in the electrical components within the machine from aging. Accordingly, the same settings may be used after a long period of time and the same results will be obtained from welding.

With this mechanization, the pattern of motion of the platen between predetermined positions established by the digital settings are determined by an analogue function generator. Because of this, the system is economical and simple to operate. Since both the digital and the analogue settings are easily adjusted, the set-up time for different jobs is much less than would be the case if mechanical cams were used to control the cycles of motion of the platen.

The analogue function generators control the hydraulic actuating system to move the platens with the proper velocity during the flashing step. It has been determined that the best results are obtained from an exponential type of change in the velocity of the platens. This exponential change may be thought of being parabolic with respect to time.

This parabolic acceleration of the platen is obtained from generating a parabolic voltage wave form with analogue function generators having starting and stopping times as determined by a digital apparatus that is controlled by the position of the platen. These analogue voltages control a servo hydraulic valve. Fluid flowing under pressure through the servo hydraulic valve controls the motion of a hydraulic cylinder that is rigidly connected to the platen which is holding one of the workpieces. The time at which each of the various steps in the flash welding process start and stop is also controlled by the digital system.

Accordingly, it is an object of this invention to provide an improved method and apparatus for controlling the pattern of motion of the workpieces with respect to each other during flash welding.

The above noted and other objects and features of the invention will be better understood from the following detailed description when considered with reference to the accompanying drawings in which:

FIGURE 1 is a block diagram illustrating an embodiment of this invention;

FIGURE 2 is a more detailed block diagram of a portion of the embodiment of the invention of FIG. 1 which develops electrical signals for controlling a flash welder; and FIGURE 3 is a more detailed block diagram of a portion of the embodiment of FIG. 1 illustrating the manner in which the signals generated by the system shown in FIGURE 2 control the movable platen of the welder.

In FIGURE 1, a block diagram of the overall system of this invention is shown having a platen motion control unit 10 adapted to control the motion of a movable platen in a flash welder 12. The movable platen and another stationary platen each hold a different one of two workpieces that are to be welded together in a manner known in the art. The platen motion control unit 10 changes the position of the movable platen in response to signals received from either a servo amplifier 14 or an upset control circuit 16. The servo amplifier 14 adds a negative current applied to its input through conductor 20 and a positive current applied to its input through conductor 22 and supplies the resulting signal to the platen motion control unit 10. With this mechanization, a closed loop control system is formed in which the signal from the platen motion control switching circuit determines the position of the movable platen.

A suitable flash welder 12 having a platen motion control unit 10 and an upset control 16 for use in this invention when modified as hereinafter described is designated as McKay flash welder, Model No. F8, and may be purchased from the Federal Machine and Welder Company, Warren, Ohio.

This welder is a conventional hydraulic welder in which a movable platen holds a workpiece and is hydraulically moved toward a stationary platen holding another workpiece while a voltage is applied between the two platens and the two workpieces. As the platens move together, an arc between the workpieces is formed to burn off any ragged edges or projections from the surfaces that are to welded together. Later, this arc also heats the surfaces that are to be welded together to a near molten state. When this operation is completed, the two workpieces are pressed together to effect the weld.

During the flashing portion of the welding operation in this invention, the hydraulic cylinders, which control the positioning of the movable platen, are controlled in their operation by signals received from the servo amplifier 14. Once the flashing operation is completed, the cylinders are controlled by a signal received from the upset control 16 to move the platen with a required force to press the two workpieces together and to effect a proper weld.

In this invention, the flash welder 12 is modified by having a digital platen motion transducer 26 attached to its movable platen to generate a plurality of pulses proportional to the linear movement of the platen. Similarly, an analogue platen motion transducer 28 is attached to the movable platen to provide a negative voltage which is also proportional to the motion of the movable platen.

The voltage provided by the analogue platen motion transducer 28 to the servo amplifier 14 over conductor 20 indicates the actual position of the movable platen in the flash welder 12. This signal is added to the signal received through conductor 22 from a platen motion switching circuit 30 to arrive at the signal which controls the platen motion control unit 10 during the flashing operation of the flash welder 12. The servo amplifier 14 responds to the difference in the signal received from conductor 20 and the signal received from conductor 22 to move the movable platen until the signal received over the conductor 20 is equal to the signal received over the conductor 22. In this manner, the position of the movable platen is controlled by the signal applied to the servo amplifier 14 from the platen motion switching circuit 30 through the conductor 22 during the flashing operation.

The pulses generated by the digital platen motion transducer 26 are applied to a preset counter 32 which in turn applies pulses over a different one of the four output conductors 34A–34D at each of four different settable counts on the preset counter 32. The signals applied to the platen motion switching circuit 30 through the conductors 34A–34D control the time that certain other signals to be hereinafter described are applied to the conductor 22 by the platen motion switching circuit 30. These signals are applied to the servo amplifier 14 to control the motion of the movable platen during certain portions of the flashing operation. The signal applied to the platen motion switching circuit 30 over the conductor 34D from the preset counter 32 results in a signal applied from the platen motion switching circuit 30 to the upset control unit 16 over the conductor 36, which signal initiates the operation of the upset control unit 16 to cause the movable platen to effect a weld by pressing the workpieces together.

Prior to the flashingt operation, the movable platen moves away from the fixed platen to an initial starting position which is adjustable by the operator. In this embodiment, the adjustment is made through potentiometers which control a voltage applied to the platen motion switching circuit 30 from the initial die opening circuit 38 and the secondary retraction position circuit 40. These adjusted voltages are applied to the servo amplifier 14 through the conductor 22 at a time determined by the timer 42. The timer 42 is manually started into operation after the adjustments for the initial die opening circuit 38 and the secondary retraction position circuit 40 have been made.

The motion of the movable platen during the flashing operation is controlled by signals applied to the platen motion switching circuit 30 from the function generator indicated generally at 44. The function generator 44 includes four circuits 46A–46D each of which generates a parabolic-shaped voltage output at a rate which is individually adjustable. Each of these parabolic-shaped voltage wave forms are sequentially applied to the platen motion switching circuit 30. These signals each sequentially control the motion of the movable platen at times determined by the platen motion switching circuit 30, which applies them to conductor 22 at times determined by pulses received over the conductors 34A–34D from the preset counter 32.

A voltage is applied across the workpieces through the two platens for an adjustable time while the movable platen is in a position determined by the secondary retraction position circuit 40. When this adjustable time has elapsed, as is determined by the timer 42, the platen motion switching circuit 30 applies the output from the first parabola of the function generator 46A to the conductor 22 to slowly start the movable platen in motion towards the stationary platen.

At the same time, the preset counter 32 begins counting pulses received from the digital platen motion transducer 26. These pulses are proportional to the motion of the movable platen toward the stationary platen.

After a preset number of pulses have been counted by the preset counter 32, the preset counter 32 applies a pulse to the platen motion switching circuit 30 over conductor 34A, which pulse connects the output of the second parabola of the function generator 46B to the conductor 22. Now the movable platen moves at a rate determined by the output of the second parabola of the function generator 46B. After the preset counter 32 has counted to the second preset number, it applies a pulse to the platen motion switching circuit 34B which pulse connects the third parabola of the function generator 46C to the conductor 22. The output of this section of the function generator now controls the motion of the movable platen. Similarly, after a predetermined number of counts from this time, the preset counter applies a pulse over conductor 34C to the platen motion switching circuit to apply the fourth parabola from the function generator 46D to the conductor 22. Although the parabolas of the function generator are shown as separate blocks in FIG. 1, they are actually part of a single circuit, which circuit adds a new function to the prior parabola to generate a new parabola.

Finally, after the preset counter 32 has counted to a last of the predetermined counts, a pulse is applied over conductor 34D to the platen motion switching circuit 30, which pulse indicates that the flashing operation is complete. A signal is also applied over conductor 36 to the upset control unit 16. In response to this signal, the upset control unit 16 activates the platen motion control unit 10 to rapidly move the two workpieces together with a predetermined pressure such that a weld is formed. Additional force is applied to the platen by the platen motion control unit 10, which force is not under the control of the servo amplifier 14. The output of the servo amplifier 14 is disconnected from the platen motion control unit 10, but it still receives a signal from the function generator 44. The output of the servo amplifier 14 is applied to a dummy load to keep the function generator on-line.

It can be seen that the motion of the movable platen during the flashing operation is controlled by both digital signals from the digital platen motion transducer 26 and analogue signals from the analogue platen motion transducer 28. The digital signals accurately control the total length of motion of the movable platen and select the velocity pattern for the movable platen over predetermined lengths of this motion. This selection consists of choosing the particular velocity characteristics from a group of functions available in an analogue function generator. The function generator is kept in the circuit at all times. When it is not controlling the position of the platen, its output is applied to a dummy load. Any drift in the function generator is absorbed in the positioning of the platen during the product loading step, which position is not critical.

In FIGURE 2 a more detailed diagram of a portion of the invention is shown having a fixed platen 48 fitted with a clamp 50 that rigidly holds a first workpiece 52 having an edge 54 which is to be welded to a second workpiece 56. This second workpiece 56 is mounted in a second clamp 58 that is mounted on the movable platen 60.

The stationary platen 48 and the movable platen 60 each have a different electrode 64 and 66 mounted upon their respective clamps. The electrodes 64 and 66 are interconnected by secondary winding 68 of the power transformer 70. A primary winding 72 of the transformer 70 is connected to a power supply 74 and contains a conventional voltage adjustment switch indicated schematically at 76. A hydraulic drive mechanism 78 controls the position of the movable platen 60 in response to the output from the servo amplifier 14. The servo amplifier 14 provides its controlling signal to the hydraulic drive 78 whenever the normally open relay contacts 84 are closed.

The movable contact 86 of a linear potentiometer 88 is connected to the movable platen 60 to move therewith along the linear resistor 90. One end of the linear resistor 90 is electrically connected to a source of negative potential 92 and its other end is connected to the movable contact 94 of the potentiometer 96. The movable contact 86 applies a negative voltage to the input terminal 98 of the servo amplifier 14 through the normally open relay contacts 100 when these contacts are closed. The amplitude of this voltage is inversely proportional to the distance that the movable contact is from the end of the linear resistor 90 nearest to the source of negative potential 92. The source of negative potential 92 and the potentiometer 88 comprise the analogue platen motion transducer 28 which provides a reference voltage to be added with the voltage from the function generator 44 to control the motion of the movable platen 60 during the flashing operation. The relay contacts 84 and 100 are controlled by a relay in the platen motion switching circuit 30 (FIGURE 1).

One end of the resistor 102, which is part of the potentiometer 96, is connected to the movable contact 104 of the potentiometer 106 and the other end of the resistor 102 is connected to one end of the resistor 108 within the potentiometer 106, to an end of the resistor 111 of the potentiometer 112, to the movable contact 110 of the potentiometer 112, and to one contact 114 of the normally closed relay contacts 116. The other end of the resistor 108 is connected to a negative source of potential 118. The other end of the resistor 111 within the potentiometer 112 is connected to the other contact 120 of the normally closed relay contacts 116 and also to a source of positive potential 122. The relay contacts 116 are also located within the platen motion switching circuit 30 (FIGURE 1).

The potentiometer 96 is adjustable and provides a voltage to the servo amplifier 14 in series with the feedback voltage from the analogue platen motion transducer 28 which causes the movable platen 60 to be positioned at its initial die opening position. The potentiometer 106 and the potentiometer 112 determine the position of the movable platen 60 during the preheating portion of the flash welding cycle. As is known to those skilled in the art, this portion of the cycle takes place prior to the flash operation and serves to raise the temperature of the workpieces. This portion of the cycle is initiated by opening the contacts 114 to apply a positive opposing voltage from the source of positive potential 122 and the negative source of potential 118 as determined by the settings of the potentiometers 112 and 106 to the input 98 of the servo amplifier 14.

When the normally closed contacts of the relay 116 are in their normal position, the voltage from the source of positive potential 122 and the negative source of potential 118 cancel out at the movable tap 94 and have no effect on the positions of the movable platen 60. The normally closed contacts 114 and 120 are opened by a relay within the platen motion switching circuit 30 (FIGURE 1) at a time determined by the timer 42 to provide for the preheat portion of the welding operation. This time is also controlled by the time delay 42 (FIGURE 1).

A Saginaw screw 124 is threadably engaged with the movable platen 60 to turn as the platen 60 is moved with respect to the stationary platen 48. The end of the Saginaw screw 124 is connected to the input of a digital transducer 26. This transducer includes a disc 130 rotatably mounted on the end of the screw 124 to turn therewith and having a plurality of perforations 132 passing through its flat sides and forming together a circle close to the edges of the disc 130. A lamp 134 is mounted on one side of the disk 130 and a photocell 136 is mounted on the other side.

The photocell 136 is mounted adjacent to the path of the holes 132 as the disk 130 rotates with the Saginaw screw 124. The output from the photocell 136 is connected to a pulse shaping circuit 138 which applies voltage pulses to the preset counter 32 in response to changes in the resistance of the photocell 136. As the disk 132 rotates, light from the lamp 134 passes through the holes 132 of the disk 130 which is adjacent to the photocell 136 causing the light to impinge thereon and change its resistance. In this manner, the counter 32 receives pulses indicating the rotation of the Saginaw screw 124 which is also proportional to the lateral movement of the platen 60.

The digital transducer 26 may be of the type designated as Digipulser, Model 4326A, manufactured and sold by Amtron, Incorporated, 14631 S. Waverly Ave., Midlothian, Ill. The preset counter 32 may be a four channel preset control, Model No. 4SPC–4RO, produced and sold by Amtron, Incorporated and adapted to be used with the aforesaid Digipulser produced by the same company. This preset counter 32 includes four switches which may be adjusted to close at predetermined counts. These are the switches used in the platen motion switching circuit 30 to connect the function generator 44 to conductor 22 which leads to servo amplifier 14.

The preset counter 32 is reset between cycles while movable platen 60 is at a zero position. It is activated by a static pulse from the timer 42 which also causes the first parabolic function to be applied to the servo amplifier 14 from the function generator 44 as the movable platen 60 begins to move forward into the flashing portion of the flash welding cycle. The timer 42 may be the electronic delay timer 3S750ET560 and timing dial 3S7504TM560A1, manufactured by General Electric Corporation. This unit includes the necessary time delays and power relays for this operation.

The function generator 44 may be function generator type 96–133 manufactured and sold by Exact Electronics, Incorporated, Hillsboro, Oreg. This unit provides the desired four segments of a parabolic wave form as needed in this application. The output wave forms are generated in integrating operational amplifiers, by changing the pulse rate of a voltage impressed across the feedback capacitors of operational amplifiers in accordance with a predetermined function. The unit has a single output coming from a final stage of an operational amplifier.

Each parabolic segment is initiated by the voltage from an integrating operational amplifier which voltage was the final voltage on the parabolic segment preceding it. The time which elapses from the beginning of a single parabolic segment to the end of the segment is adjustable. This is controlled by the rate at which the capacitors leading to the inputs of the operational amplifiers are charged. It is manually adjustable from the control panel of the function generator unit.

The time at which individual segments of the parabolic function are connected to the output terminal is separately controlled by four external contacts, each of which controls an individual parabolic segment. When the first contact is grounded, the first parabolic wave form from the first segment is initated at the output of the function generator. When the second contact is grounded, the voltage wave form from the first parabolic segment is altered by an added function to initiate the second parabolic segment. This process is repeated for the other two contacts. Of course, in this embodiment of the invention, the individual contacts are grounded through the contacts of the preset counter 32.

In FIGURE 3, a diagram is shown illustrating the manner in which the platen motion control unit 10 (FIG. 1) controls the position of the movable platen 60. The platen motion control unit 10 includes a source of hydraulic pressure 140 which supplies fluid to three hydraulic cylinders 142, 144 and 146. Each of these cylinders includes a different one of the rods 148, 150 and 152, which rods have one end connected to the movable platen 60 and the other end connected to one piston of a different one of the hydraulic cylinders 142, 144 and 146.

Hydraulic fluid is applied from the hydraulic pressure source 140 to the servo valve 164. At the beginning of a cycle of flash welding, the output of the servo amplifier 14 is applied to the servo valve 164 through the relay contacts 160. In response to this signal, the servo valve 164 applies fluid to the rod end of the hydraulic cylinder 144 to move the movable platen 60 back to its preheat position. A relay in the platen motion switching circuit 30 (FIGURE 1) maintains the normally open relay contacts 160 closed for a predetermined amount of time until the workpieces are raised to the proper temperature. Next the relay contacts 162 are closed.

When the relay contacts 162 are closed, the output of the servo amplifier 14 is applied to the servo valve 164. The servo valve 164 then connects the hydraulic pressure source 140 to the piston side of the hydraulic cylinder 144 to move the movable platen 60 forward toward the stationary platen. The flash welder is now in the flash operation portion of its cycle. The signal from the servo amplifier moves the movable platen 60 forward at an exponentially increasing rate under the control of the outputs from the function generator as explained above. At a predetermined position as determined by the preset counter 32 (FIGURES 1 and 2), the servo valve 164 is closed. At the same time each of the four pilot operated check valves 166, 168, 170 and 172 are opened by a four way solenoid controlled valve in response to pulses from the preset counter. Valves 166, 168 and 170 connect hydraulic fluid under high pressure to the piston end of the hydraulic cylinders 142, 144 and 146 respectively and valve 172 vents the rod end of the hydraulic cylinder 144.

The accumulator 174 contains fluid under pressure from the hydraulic pressure source 140 in a quantity sufficient to activate all three cylinders at the same time. Accordingly, the movable platen 60 is moved forward into its upset position where it is maintained until the proper weld is formed. The pressure from hydraulic cylinders is then released under the control of a signal from a timer incorporated in the aforementioned McKay welder in an manner known in the art. The servo amplifier 14 and servo valve 164 are manufactured and sold by MOOG Servocontrols, Inc., East Aurora, N.Y., and are for the series 72 Industrial Servo valve manufactured by that company.

It can be seen that the movable platen 60 is moved back to its open die position and its preheat position by the hydraulic cylinder 144 under pressure through the servo valve 164. The movable platen 60 is moved forward in the flashing portion of the welding cycle under the control of the central hydraulic cylinder 144.

All three cylinders move the movable platen 60 forward during the upset portion of the welding cycle. The use of all three cylinders at this time enables a single servo valve 164 to control the movement of the platen during flashing instead of a plurality of valves with a control system to keep them operating together or a much larger servo valve that could operate both during upsetting and during flashing.

It can be seen that the programming system for the movable platen of a flash welder in accordance with this invention provides accurate control and reproducible control over the motion of the movable platen. The digital control over the length of motion of the movable platen during flash operation can be recorded and reproduced at any latter time. It is not dependent upon components which age so that it will be exactly reproducible in the future. The digital settings of the preset counter 32 can be used at any time. The rate of change of the motion of the platen within the periods controlled by the digital programmer are controlled by an analogue system. The drift in the analogue system does not cause serious variations from cycle to cycle because the digital system which has no drift, controls the length of motion of the movable platen that is controlled by each segment of the analogue function generator. Both the digital system and the analogue system are easily adjusted so that the set-up time for welding between different kinds of jobs is reduced over that necessary when mechanical cams are used to control the flash welding portion of the welding cycle.

Although the invention has been described in its preferred form with a certain degree of particularity, it is understood that the present disclosure of the preferred form has been made only by way of example and that numerous changes in the deails of construction and the combination and arrangement of parts may be resorted to without departing from the spirit and scope of the invention as hereinafter claimed.

What is claimed is:

1. In a flash welding apparatus, the combination comprising:
 (a) first and second relatively movable workholding clamps for holding first and second workpieces to be welded together;

(b) drive means for relatively moving said clamps;
(c) speed control means for varying speed of said drive means in response to control signals applied thereto;
(d) function generator means for generating a series of exponentially varying control signals;
(e) pulse generator means for generating a plurality of pulse signals, said plurality being indicative of distance said clamps have moved relative to each other; and
(f) switching means for connecting various ones of said series of exponentially varying control signals to said speed control means in response to said pulse signals.

2. The combination of claim 1, wherein successive ones of said series of exponentially varying control signals are connected to said speed control means in response to increasing pluralities of said pulse signals.

3. The combination of claim 2, wherein each said exponentially varying control signal has an initial value equal in amplitude to final value of the next preceding exponentially varying control signal.

4. The combination of claim 1, wherein said drive means comprises:
(i) at least one hydraulic cylinder connected to at least one of said clamps and adapted to be moved by changes of pressure therein;
(ii) a source of fluid under pressure; and
(iii) a servo valve connecting said source of fluid to said at least one hydraulic cylinder and actuatable by said speed control means.

5. The combination of claim 1 in which said pulse generator means comprises:
screw means threadably attached to one of said movable clamp means to rotate as said one clamp moves longitudinally relative to the other;
a disc mounted on said screw means to rotate therewith and including a plurality of apertures;
a lamp mounted on one side of said disc;
a photoelectric cell mounted on the other side of said disc, whereby light from said lamp impinges on said photoelectric cell through said apertures as said disc rotates;
pulse shaping circuit means connected to said photoelectric cell for generating a plurality of pulses in response to variations in the resistance of said photoelectric cell caused by intermittent light impinging thereon through said apertures in said rotating disc;
a counter having a plurality of output terminals and an input terminal;
said input terminal of said counter being connected to the output of said pulse shaping circuit, whereby said counter counts said pulses generated by said pulse shaping circuit; and
connector means connecting predetermined ones of said output terminals of said counter to said switching means, whereby said exponentially varying control signals are selected in accordance with the setting of said connector means and the number of pulses received on said counter input terminal.

6. A method of flash welding, which includes the steps of:
(a) positioning a first workpiece a predetermined distance away from a second workpiece;
(b) applying a voltage between said first and second workpieces;
(c) moving said workpieces relatively toward one another at various rates of speed, each of which rates varies exponentially with time; and
(d) changing from one exponential rate to another when said workpieces have moved predetermined distances toward one another.

7. The method of claim 6, further including the step of pressing said workpieces together with a predetermined force after said workpieces have moved a predetermined distance toward one another at said exponentially varying rates.

8. The method of claim 7 wherein one of said workpieces is held in a fixed position.

References Cited
UNITED STATES PATENTS

| | | | |
|---|---|---|---|
| 2,472,368 | 6/1949 | Cox et al. | 219—86 |
| 3,341,685 | 9/1967 | Paton et al. | 219—100 |
| 2,727,969 | 12/1955 | Platte | 219—97 |
| 3,204,078 | 8/1965 | Cavanagh | 219—97 |

JOSEPH V. TRUHE, Primary Examiner
M. C. FLIESLER, Assistant Examiner

U.S. Cl. X.R.
219—97